United States Patent [19]
Ohtani

[11] Patent Number: 5,753,986
[45] Date of Patent: May 19, 1998

[54] EXPLOSION PROOF FOR ELECTRIC MOTOR

[75] Inventor: Yukio Ohtani, Kawasaki, Japan

[73] Assignee: Tokico Ltd., Kanagawa-Ken, Japan

[21] Appl. No.: 751,639

[22] Filed: Nov. 18, 1996

[30] Foreign Application Priority Data

Nov. 21, 1995 [JP] Japan ............... 7-303126

[51] Int. Cl.$^6$ ........................................ H02K 9/26
[52] U.S. Cl. ..................... 310/56; 310/52; 310/54; 310/55; 310/58; 310/59; 310/60 A; 310/90
[58] Field of Search .................... 310/52, 56, 90, 310/54, 55, 58, 59, 60 A

[56] References Cited

U.S. PATENT DOCUMENTS

| | | | |
|---|---|---|---|
| 4,498,024 | 2/1985 | Moretti et al. | 310/54 |
| 4,580,471 | 4/1986 | Oyama et al. | 82/28 R |
| 4,709,180 | 11/1987 | Denk | 310/179 |
| 5,019,733 | 5/1991 | Kano et al. | 310/61 |
| 5,099,160 | 3/1992 | Strozel et al. | 310/56 |
| 5,130,585 | 7/1992 | Iwamatsu et al. | 310/59 |
| 5,214,325 | 5/1993 | Matson et al. | 310/58 |
| 5,382,858 | 1/1995 | Sugiyama | 310/90 |
| 5,424,600 | 6/1995 | Ishikawa et al. | 310/220 |
| 5,605,045 | 2/1997 | Halimi et al. | 60/607 |

*Primary Examiner*—Thomas M. Dougherty
*Assistant Examiner*—Elvin G. Enad
*Attorney, Agent, or Firm*—Pearne, Gordon, McCoy & Granger LLP

[57] ABSTRACT

A bearing 12 is provided on the end portion of a housing 30. This bearing 12 supports a shaft 14. A magnetic circuit 15, 16 for driving the shaft 14 is provided between the shaft 14 and the housing 30 with a gap 29 passing through in an axial direction. An entry route R1 for leading gas from the outside of the housing 30 to the gap 29 in the magnetic circuit 15, 16 and an exhaust route R2 for exhausting the gas to the outside of the housing 30 are provided so as not to reach the bearing 12. As a result, the lifespan of the electric motor can be lengthened, the startup time can be shortened, the number of parts can be reduced, the number of steps required for processing and assembly can be reduced, and the power loss can be decreased.

5 Claims, 3 Drawing Sheets

PRIOR ART

EXPLOSION PROOF FOR ELECTRIC MOTOR

BACKGROUND OF THE INVENTION

1. Technical Field of the Invention

The present invention relates to electric motors which are explosion-proof, for use in robots such as coating applicator robots.

2. Background Art

An example of a conventional electric motor will be explained with reference to FIG. 3. FIG. 3 is a drawing showing an actuator using this electric motor. This actuator is roughly composed of a conventional electric motor 9A, a reduction gear 10A, and a flange 34 provided between the electric motor 9A and the reduction gear 10A. The electric motor 9A, as per convention, has a shaft 14A, bearings 12 and 13 which rotatably support respective ends of the shaft 14A, a housing 30A which covers the shaft 14A and the bearings 12 and 13, and an oil seal 35A provided between the housing 30A and the shaft 14A. Furthermore, this electric motor 9A has the following structure for preventing explosions due to internal pressure. A slight gap is formed between the shaft 14A and the outer ring 13a of the bearing 13 such as not to allow the passage of air.

That is, entry ports 20 forming a portion of an entry route R11 for introducing gas G from the outside are provided in one end portion (to the righthand side in FIG. 3) of the housing 30A of the electric motor 9A. On the other end (to the lefthand side of FIG. 3) of the housing 30A, exhaust holes 41 for exhausting gas G are formed. The exhaust holes 41 pass through the outer sides of the bearing 12 and open onto an attachment surface 30a which is the end surface of the end portion of the housing 30A. The flange 34 is connected to this attachment surface 30a. The flange 34 communicates with the exhaust holes 41. For example, the flange 34 is shaped in the form of a ring which is coaxial with the input shaft 42 of the reduction gear 10A.) Additionally, the flange 34 has a space 38 which adjoins the input shaft 42 and communicates with a shaft hole containing the portion of the shaft 14A further to the end than the bearing 12, and an exhaust hole 37 which communicates with the space 38. The open end of the exhaust hole 37 has a gas flow tube attachment port 37a. That is, the flange 34 has an exhaust route R12 composed of exhaust holes 41, the space 38 and the exhaust hole 37 which converge on the gas flow tube attachment port 37a. This exhaust route R12 communicates with the outside by way of this gas flow tube attachment port 37a. Additionally, the flange 34 is provided with an oil seal 36 (sealing member) for closing off the gap between the flange 34 and the input shaft 42.

However, with this type of conventional electric motor 9A, there is the risk of gas G flowing into the space 38 in the flange 34 through the bearing 12 on the flange 34 side in the electric motor 9A. In such a case, the grease on the bearing 12 can be carried away, thus shortening the lifespan of the bearing 12. Additionally, the flow resistance to the gas G becomes large, and the flow capacity of the gas G large due to the exhaust hole 37 and the space 38 formed in the flange 34. For this reason, there is the problem of the scavenging time during startup of the electric motor 9A becoming long.

Furthermore, the flange 34 is provided separate from the other parts, and the flange 34 is provided with an oil seal 36 separate from the oil seal 35A of the electric motor 9A; therefore, the number of parts and steps required for assembly and processing is considerable. Moreover, the rotational resistance of the shaft 14A is large because the flange 34 is provided with an oil seal 36 separate from the oil seal 35A of the electric motor 9A. As a result, there is a problem in that the power loss of the shaft 14A is large.

SUMMARY OF THE INVENTION

The electric motor according to the present invention comprises a housing; a bearing provided on an end portion of the housing; a shaft supported by the bearing; a magnetic circuit for driving the shaft, having a gap passing in an axial direction thereof; a gas entry route, which does not reach the bearing, for entering gas from outside of the housing into the gap in the magnetic circuit; and a gas exhaust route, which does not reach the bearing, for exhausting the gas entering from the gas entry route. As a result, gas can be prevented from passing from the gap in the magnetic circuit and flowing inside the bearing. Consequently, grease is prevented from being removed from inside the bearing, and the lifespans of the bearing and electric motor can be lengthened. Furthermore, gas does not leak from the bearing, so that the time required to scavenge the housing can be shortened, thereby shortening the startup time of the electric motor.

BRIEF DESCRIPTION OF THE DRAWINGS

These and further feature of the present invention will be apparent with reference to the following description and drawings wherein.

PREFERRED EMBODIMENTS OF THE INVENTION

Figure 2:
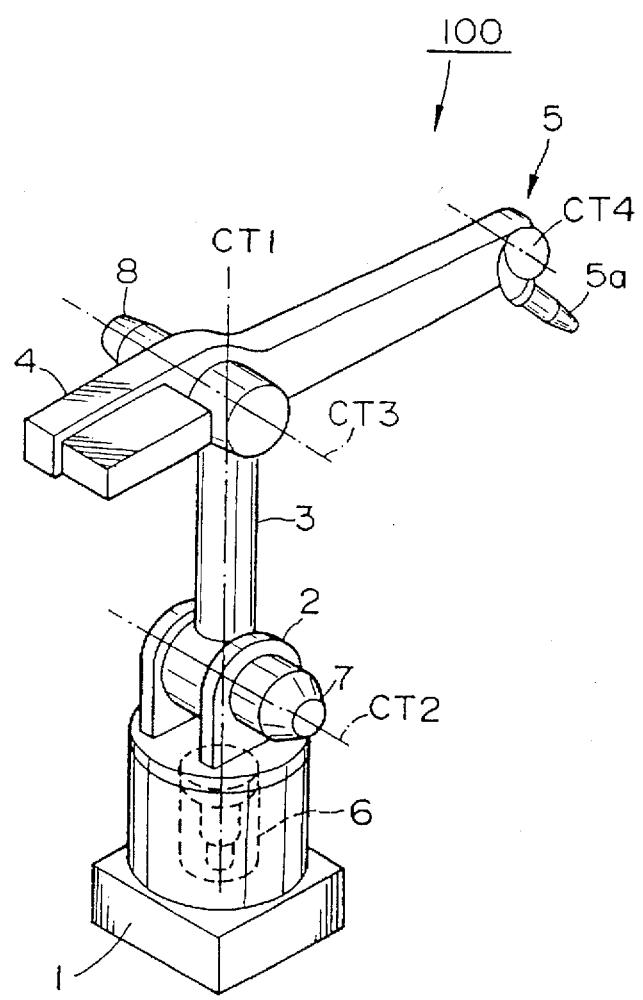
FIG. 2 is an overall view showing a coating applicator robot using the electric motor of FIG. 1.

FIG. 2 is an overall view of a coating applicator robot using the present invention. Reference numeral 100 denotes a coating applicator robot. This coating applicator robot 100 has a stationary base 1 which is affixed to the floor. A swinging base 2 which is capable of rotating about a vertical rotational axis CT1 is attached to this stationary base 1 by means of a first actuator 6. The base portion of a first arm 3 which is capable of turning about a horizontal rotational axis CT2 is attached to the swinging base 2. A second arm 4 which is capable of turning about a rotational axis CT3 which is parallel to the rotational axis CT2 is provided on the tip portion of the first arm 3. A wrist portion 5 having three degrees of freedom, of which the first is the capability of rotating about a rotational axis CT4, is provided on the tip of the second arm 4. A nozzle 5a for spraying coating agent is provided on the wrist portion 5. That is, this coating applicator robot 100 has six degrees of freedom for freely moving the nozzle 5a in order to apply coatings.

A first actuator 6 for rotating the swinging base 2 about the rotational axis CT1 is provided between the stationary base 1 and the swinging base 2. A second actuator 7 for rotating the first arm 3 about the rotational axis CT2 is provided between the swinging base 2 and the base portion of the first arm 3. A third actuator 8 for rotating the second arm 4 about the rotational axis CT3 is provided between the tip portion of the first arm 3 and the second arm 4. The first actuator 6, the second actuator 7 and the third actuator 8 have approximately identical structures. The wrist portion 5 is operated by an actuator (not shown in the drawings) which rotates the nozzle 5a.

Figure 1:
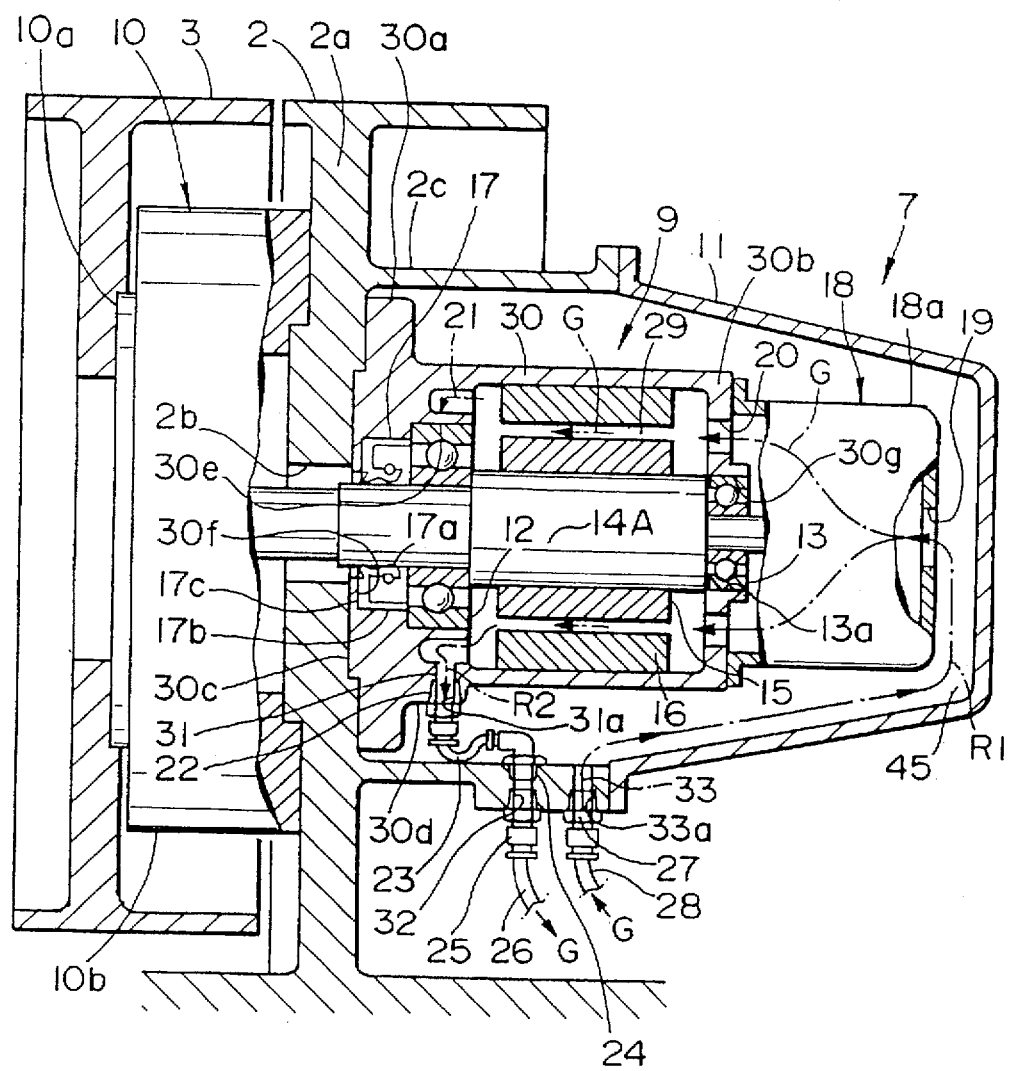
FIG. 1 is a diagram showing an embodiment of an electric motor according to the present invention.
Figure 3:
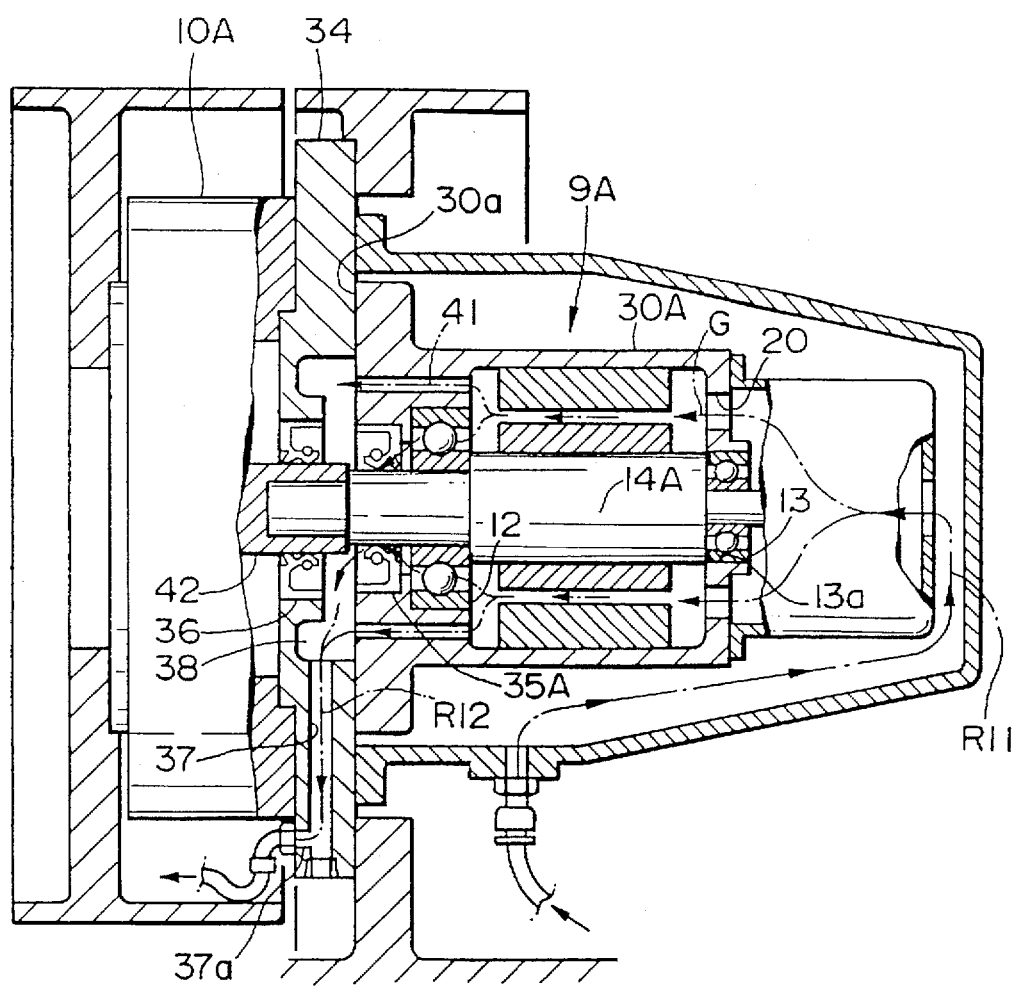
FIG. 3 is a diagram showing an example of a conventional electric motor.

Below, the second actuator 7 will be explained with reference to FIG. 1. The parts which are identical to the actuator shown in FIG. 3 are given the same reference numerals.

The second actuator 7 comprises an electric motor 9, a reduction gear 10, a position transducer 18 and a motor cover 11. The electric motor 9 and the reduction gear 10 are respectively attached to the front surface and the rear surface of an attachment plate portion 2a of the swinging base 2. A shaft insertion hole 2b is formed in the attachment plate portion 2a of the swinging base 2. One end of the shaft 14 of the electric motor 9 is inserted into this shaft insertion hole 2b, and is coupled to an input shaft (not shown in the drawing) of the reduction gear 10. The base portion of the first arm 3 is affixed to the output shaft 10a of the reduction gear 10. The position transducer 18 is provided on the electric motor 9. This position transducer 18 detects the rotation of the other end of the shaft 14 of the electric motor 9, and measures the angular position of rotation of the first arm 3.

The attachment plate portion 2a of the swinging base 2 has, on its front surface side, a tubular portion 2c for enclosing approximately half of the housing 30 of the electric motor 9 on the flange portion 30a side. The motor cover 11 encloses the remaining half of the electric motor 9 and the position transducer 18, and is attached to the tubular portion 2c. This motor cover 11 covers the area around the electric motor 9 and the position transducer 18.

The electric motor 9 has a housing 30 having flange portions 30a and 30b formed on both ends. The flange portions 30a and 30b are respectively provided with bearings 12 and 13. These bearings 12 and 13 rotatably support the shaft 14. A permanent magnet 15 is affixed around this shaft 14. An electromagnetic coil 16 is provided around the permanent magnet 15 in the housing 30. A gap 29 coaxial to the shaft 14 and passing in the direction of the shaft 14 is formed between the electromagnetic coil 16 and the permanent magnet 15. The permanent magnet 15 and the electromagnetic coil 16 form a magnetic circuit for rotating the shaft 14.

The housing 30 has an attachment surface 30c which is attached to the surface of the attachment plate portion 2a of the swinging base 2 formed on the end surface of the flange portion 30a on one end (the lefthand side of FIG. 1) of the housing 30, and another surface 30d. The central portion of the flange portion 30a has a shaft hole 30e. The shaft 14 is passed through the shaft hole 30 of the flange portion 30a. A bearing 12 is fitted onto the portion of the shaft hole 30e on the inner side of the housing 30. Additionally, the portion of the shaft hole 30e on the outer side of the housing 30 has a reduced diameter. An oil seal 17 is fitted as a sealing member into this outer side portion, i.e. the end portion side of the bearing portion of the shaft 14, oriented so as to oppose pressure from the magnetic circuit side. Here, the bearing portion is the portion on the end portion side (the lefthand side in FIG. 1) of the bearing 12 of the shaft 14.

The oil seal 17 is composed of an inner tube portion 17a which rotatably fits over the outer circumferential surface of the shaft 14, an outer tube portion 17b which fits with the outer side portion of the shaft hole 30e, and a disk portion 17c provided between the end portions of the inner tube portion 17a and the outer tube portion 17b on the outer side of the housing 30. This oil seal 17 is also a component of the electric motor 9. Additionally, the outer side portion of the shaft hole 30e has a further reduced diameter. As a result, a sealing member holding surface 30f which opposes the gap 29 in the magnetic circuit by way of the bearing 12 is formed in the shaft hole 30e. The disk portion 17c of the oil seal 17 is joined and held at this sealing member holding surface 30f.

Additionally, a space 21 forming a ring-shaped groove around the bearing 12 is formed on the surface of the flange portion 30a facing the gap 29 of the magnetic circuit. This space 21 opens toward the gap 29 of the magnetic circuit and communicates therewith. An exhaust hole 31 which passes through the surface 30d of the housing 30 from the outer circumferential surface of the space 21 is formed in the flange portion 30a. The side of the exhaust hole 31 on the surface 30d of the housing 30 forms a gas flow tube attachment port 31a. The space 21 and the exhaust hole 31 form an exhaust route R2. That is, an exhaust route R2 is formed in the flange portion 30a, and converges from the space 21 forming a ring-shaped groove onto the gas flow tube attachment port 31a of the exhaust hole 31. In other words, the exhaust route R2 communicates with the outside by way of the gas flow tube attachment port 31a, and does not reach the bearing portion of the shaft 14.

A tube fitting 22 is attached to the gas flow tube attachment port 31a. A tube 23 is connected to this tube fitting 22. Additionally, an exhaust hole 32 is attached to the tubular portion 2c of the swinging base 2. Tube fittings 24 and 25 are respectively attached to both ends of the exhaust hole 32. The tube 23 is connected to the inner side tube fitting 24. A separate tube 26 is connected to the outer side tube fitting 25. The tube fitting 22, tube 23, tube fitting 24, exhaust hole 32, tube fitting 25 and tube 26 form a gas flow duct on the gas exhaust side. The tube 26 is provided with a pressure switch (not shown in the drawings) for monitoring the pressure inside the electric motor 9, and a valve for replacing the atmosphere with inert gas G and scavenging the inside of the electric motor 9 when the power to the coating applicator robot 100 is turned on.

A shaft hole 30g for fitting the bearing 13 is formed in the central portion of the flange portion 30b on the other side (the righthand side in FIG. 1) of the housing 30. An entry hole 20 passes through this flange portion 30b near the shaft hole 30g so as to allow gas G to enter the interior from the outside of the housing 30. Additionally, a casing 18a of the position transducer 18 is attached to this flange portion 30b, such as to allow communication between the space inside the casing 18a and the entry hole 20. An entry hole 19 is formed in the casing 18a so as to allow entry of gas G. That is, the entry hole 19 communicates with a space 45 formed between the casing 18a of the position transducer 18 and the electric motor 9, and the motor cover 11 and the tubular portion 2c of the swinging base 2. Additionally, an entry hole 33 is formed in the tubular portion 2c of the swinging base 2. The entry hole 33, space 45, entry hole 19, space inside the casing 18a, and the entry hole 20 form a gas entry route R1. A gas flow tube attachment port 33a for the gas entry side is formed on the end portion of the entry hole 33.

A tube fitting 27 is attached to the gas flow tube attachment port 33a. A tube 28 is connected to the tube fitting 27. The tube fitting 27 and the tube 28 form a gas flow duct. The tube 28 is provided with a gas G supply source (not shown in the drawings). The second actuator 7 has the above-described structure.

Hereinbelow, the operations of the second actuator during initialization of the coating applicator robot 100 of FIG. 2 will be explained. First, when the power to the coating applicator robot 100 is turned on, an inert gas G is force-fed from a gas G supply source (not shown in the drawing) of the second actuator 7 of FIG. 1 to the tube 28. The gas G is led through the tube fitting 27 and through the entry hole 33 in the tubular portion 2c of the swinging base 2, into the space 45 formed between the position transducer 18 and the electric motor 9, and the motor cover 11 and the tubular portion 2c of the swinging base 2. The gas G led into the space 45 passes from the space 45 through the interior of the casing 18a of the position transducer 18, through the entry hole 20 formed in the flange portion 30b of the housing 30 of the electric motor 9, and into the housing 30. The gas G led inside the housing 30 passes through the gap 29 in the magnetic circuit and flows toward the other end of the housing 30. The gas G flowing to the other end of the housing 30 passes through the space 21 formed in the flange portion 31a and converges at the exhaust hole 31, then passes through the gas flow tube attachment port 31a, tube fitting 22, tube 23, tube fitting 24, exhaust hole 32 in the tubular portion 2c of the swinging base 2, tube fitting 25, and tube 26 to be released from an exhaust valve (not shown in the drawings) to the outside. When the gas G has completely circulated through, the atmosphere inside the interior space of the casing 18a of the position transducer 18 and the interior of the housing 30 of the electric motor 9 is replaced by inert gas G, which forms an explosion-proof atmosphere.

In this case, the exhaust route R2 formed by the space 21 in the flange 30a and the exhaust hole 31 is formed so as not to reach the bearing portion of the shaft 14, so as to prevent the occurrence of conventional problems such as gas G flowing from the gap 29 of the magnetic circuit into the exhaust route R2 via the bearing 12. Consequently, the flow of gas G into the bearing 12 can be reduced in comparison to conventional apparatus. Additionally, an oil seal 17 is provided in a portion of the shaft 14 on the end portion side (the lefthand side of FIG. 1) of the bearing 12, in the shaft hole 30e of the flange 30a in which the shaft 14 is disposed. This oil seal 17 is held by a sealing member holding surface 30f opposing the gap 29 of the magnetic circuit, so as to prevent deformation of the oil seal 17 due to the pressure of the gas G. As a result, leakage of the gas G can be prevented and the flow of gas G into the interior of the bearing 12 can be further reduced. Consequently, increases in the flow resistance of the gas G can be prevented.

Additionally, in the conventional structure shown in FIG. 3, the exhaust route R12 of the housing 30A has an extended flange 34 as a portion of the exhaust route R12 in order to allow communication with the outside by way of the gas flow tube attachment port 37a; in contrast, the exhaust route R2 in the above embodiment communicates with the outside by means of a gas flow tube attachment port 31a provided in the housing 30 in order to reduce the flow capacity of the gas G.

Due to the above reasons, the scavenging time for the present embodiment can be shortened, thereby shortening the startup time.

During normal operation of the coating applicator robot 100, the gas G flowing in the above manner scavenges the atmosphere and removes heat from the position transducer 18, the bearing 13, the magnetic circuit (15, 16) and the bearing 12, thus preventing them from overheating. Specifically, the space 21 forms a ring-shaped groove around the bearing 12, so as to allow heat to be efficiently removed. As a result, the resistance to explosions of the electric motor 9 and the second actuator 7 can be further increased.

Additionally, during initialization, the flow of gas G into the bearing 12,13 is reduced without depending on normal operation, so that the grease inside the bearing 12,13 can be prevented from being removed. Therefore, the lifespan of the bearing 12,13 can be made longer. As a result, the lifespans of the electric motor 9 and the second actuator 7 can be made longer.

Additionally, the flange 34 of the conventional apparatus shown in FIG. 3 and the oil seal 36 provided on the flange 34 can be omitted, so as to reduce the number of parts, and the number of steps required for processing and assembly. Furthermore, the load on the shaft 14 in FIG. 1 can be reduced by omitting the oil seal 36, thereby securing a drop in the power loss.

Additionally, the first and third actuators 6 and 8 have structures identical to the second actuator 7, thereby providing similar effects.

In the above-described embodiment, the actuators such as the second actuator 7 are used in a coating applicator robot 100; however, the same effects can be obtained by use in other apparatus used in atmospheres requiring resistance to explosions, or apparatus used in atmospheres contaminated with dust or chemicals.

Additionally, the above embodiment of the present invention includes structures for entering gas G from the exhaust route R2 side and exhausting gas from the entry route R1.

Of course, the invention can be applied to an apparatus which does not have a position transducer 18, in which case the flange 30b can be given the same structure as flange 30a and an entry route similar to exhaust route R2 can be formed, the motor cover 11 and the tubular portion 2c can be omitted, and a gas flow tube can be attached to the gas flow tube attachment port of the entry route.

Additionally, the attachment plate portion 2a can be of any shape which allows it to support the electric motor 9, and may directly or indirectly provide support to any parts aside from the flange 30a of the housing 30. The reduction gear 10 may be omitted as well.

I claim:

1. An explosion proof for an electric motor, comprising:

a housing;

a bearing provided on an end portion of said housing;

a shaft supported by said bearing;

a magnetic circuit for driving said shaft, said magnetic circuit having a gap passing in an axial direction thereof;

a gas entry route, which does not reach said bearing, for introducing gas from outside of said housing into the gap in said magnetic circuit;

a gas exhaust route, which does not reach said bearing, for exhausting the gas entering from said gas entry route;

a sealing member provided between said shaft and said housing on an end portion side of said bearing;

a sealing member holding surface on an end portion of said housing which opposes the gap in said magnetic circuit, for holding said sealing member;

wherein said sealing member comprises an inner tube portion which rotatably fits around the outer circumferential surface of said shaft, an outer tube portion which fits into said housing and a disk portion which is provided between end portions of said inner tube portion and said outer tube portion, with one end shaped into a cross-section of an open squared-C-shape, said disk portion contacts said sealing member holding surface provided on an end portion of said housing, and the side opposite said sealing member holding surface is facing in the direction of said gap in said magnetic circuit.

2. An explosion proof for electric motor in accordance with claim 1, wherein a ring-shaped space is formed around said bearing between said entry route and said exhaust route.

3. An explosion proof for electric motor in accordance with claim 1, wherein at least one of said entry route or said exhaust route communicates with the outside by way of a gas flow tube attachment port formed on said housing.

4. An explosion proof for electric motor in accordance with claim 1, wherein said electric motor has a two-layered structure such that said housing is covered.

5. An explosion proof for electric motor in accordance with claim 4, wherein a gas flow tube attachment port is formed on said housing and an element covering said housing is provided with a hole portion communicating with said gas flow tube attachment port by means of a tube.

* * * * *